April 8, 1952     R. A. YOUNG     2,591,757
HELICOPTER ROTOR BLADE
Filed April 11, 1950
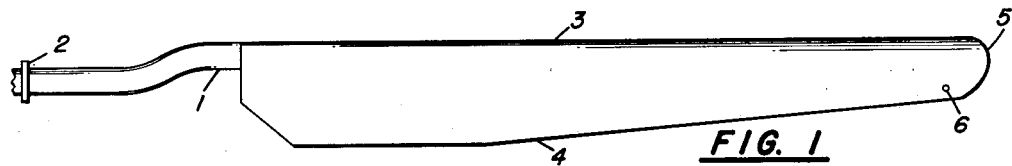
FIG. 1
FIG. 2
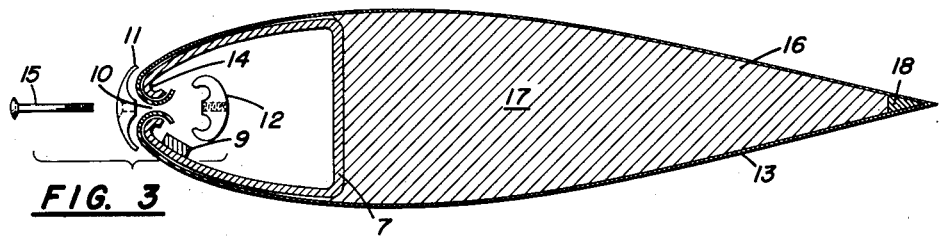
FIG. 3
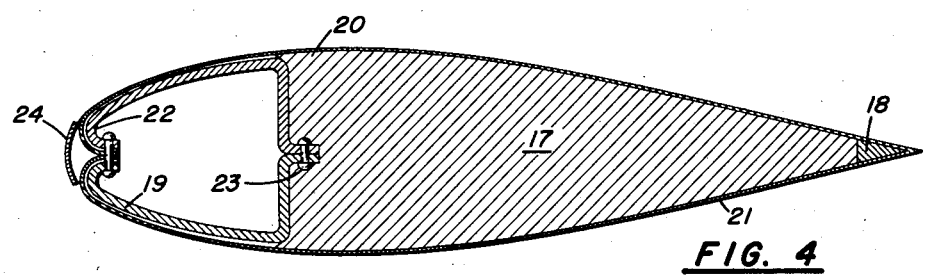
FIG. 4
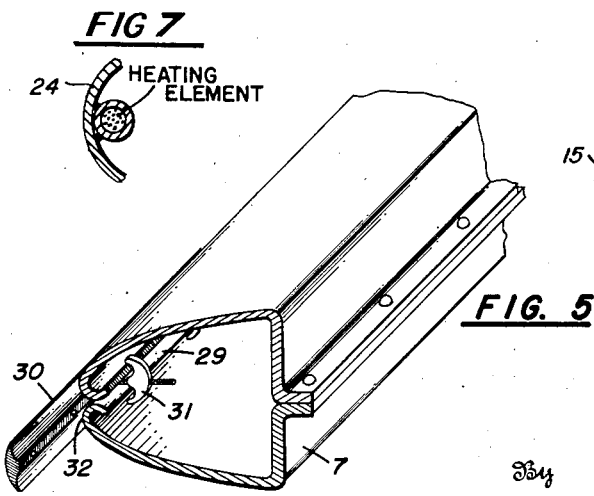
FIG 7 — HEATING ELEMENT
FIG. 5
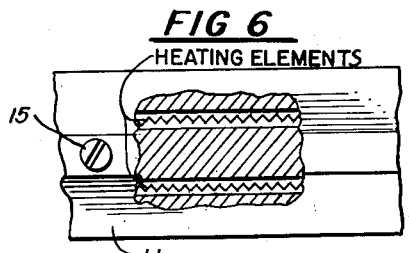
FIG 6 — HEATING ELEMENTS
Inventor
RAYMOND A. YOUNG
By Walter S. Pawl.
Attorneys Patented Apr. 8, 1952

2,591,757

UNITED STATES PATENT OFFICE 2,591,757

HELICOPTER ROTOR BLADE

Raymond A. Young, Arlington, Va.

Application April 11, 1950, Serial No. 155,318

10 Claims. (Cl. 170—159)

(Granted under the act of March 3, 1883, as amended April 30, 1928; 370 O. G. 757)

This invention relates to helicopter aircraft, and more particularly to an improvement in the construction of rotor blades therefor.

This inventor has discovered that in helicopter aircraft the performance and safety of that aircraft is, to a large extent, dependent upon the type of construction used for the rotor blades or lifting surfaces. To take full advantage of the rotor blades' lifting capabilities, it is necessary to provide a structural arrangement which will give a smooth, undistorted aerodynamic contour. Also, the construction of the rotor blades should be such that adequate structural integrity can be assured for all operating conditions. Furthermore, the method of fabrication of the rotor blades should be such as to permit thorough inspection of all portions of the blade, including the inside of the spar, prior to and during assembly of the component parts. Also, for ease of construction and repair, the after section of the rotor blade should be made as a separate integral unit and so constructed that it can be easily attached (or detached for replacement after damage). The rotor blades so constructed must permit high production, yet low cost manufacturing.

This inventor has found that, in order to provide for the aforementioned characteristics and to maintain the proper balance relationships between the aerodynamic center of lift, the blade elastic axis, the center of percussion, and the blade center of gravity, the main spar should be made as an integral leading edge, preferably of rolled steel or of other formed metallic material. The after portion or trailing edge section should be made from as light a material as possible, preferably a laminated structure for strength and rigidity. For all weather operation, provision for deicing or anti-icing must be made by hot-air passages, or by incorporation of electrical heating units located in the leading portion of the rotor blade.

In the case of previous rotor blade inventions employing similar metal construction principles, either an extruded aluminum spar section or a rolled tubular steel spar has been used. In each of these designs, the exterior skin covering is fastened by riveting, welding, or by bonding with special gluing processes. It has been found by investigation that structural failures of rotor blades can be traced to either fatigue failure in the vicinity of rivets or welding on tubular steel spars, fatigue cracks in the aluminum extrusions at the root attachment, failures of the glue bonding or failures of the skin covering at the trailing edge sections. Furthermore, this type of construction embodying a one piece spar does not lend itself to adequate internal inspection for material flaws during the manufacture and, in case of damage of any part of the blade, replacement of those parts is difficult and costly.

Thus, the present invention contemplates a method of construction that affords a multi-segmented spar (or load carrying member), a metal skin covering for a smooth aerodynamic surface, and attachment means therefor that enables rapid assembly and repair thereof. To this end, the present invention provides the multi-segmented spar that permits thorough inspection during manufacture. The joints of this spar are located on the neutral axis, or axis of minimum stress, to present a structurally adequate member with a minimum of stress concentrations. The method of attachment of the exterior skin and trailing edge section is expected to facilitate replacement as well as rapid inexpensive assembly.

The primary object of my invention is, therefore, to provide a means of constructing helicopter rotor blades with multi-sectioned spar or load carrying member with metal skin fastened to this spar in a manner to provide a smooth, uniform aerodynamic surface at all times.

Another object is to provide a means of construction of rotor blades that facilitates manufacturing and inspection during manufacturing.

Still another object of the invention is to enable inexpensive and rapid interchangeability of parts of that rotor blade that may become damaged as a result of operational usage.

Other objects and advantages of the invention will appear in the description of the invention hereinafter.

The attainment of the above specific objectives and the overcoming of the defects of the prior art helicopter rotor blades above described will not only be apparent from the following description, but also from the drawings hereto appended, which are merely illustrative of various embodiments of the preferred construction of the rotor blades of this invention, and are not otherwise limitative thereto and wherein, Figure 1 is a plan view of a helicopter rotor blade showing a preferred configuration thereof.

Figure 2 is a front elevation of the blade shown in Figure 1,

Figure 3 is a transverse vertical section showing a cross-sectional view of a preferred form rotor blade of this invention, Figure 4 is a transverse vertical section showing a cross-sectional view of another preferred form of rotor blade in which the spar is of segmental construction and the fairing strip is shown in detached position, Figure 5 is a partial isometric view of the segmental spar shown in Figure 4 showing one method of attaching the fairing strip to the spar (the metal skin being omitted), Fig. 6 is a fragmentary elevational view of one of the capstrips of the rotor blades, parts being broken away to show a deicing heater located therein, and Fig. 7 is a sectional view of the capstrips of Fig. 4, illustrating particularly, the heater carried thereby.

With further reference to the drawings, Figures 1 and 2 illustrate generally the type of helicopter rotor blade with which the present invention is concerned. It is understood that the rotor blade may be tapered in planform or in thickness or it may be uniform in either planform or thickness or any combination thereof. The spar 1 is attached to suitable fittings at the rotor hub, or blade hinge fittings or control linkages 2. The leading edge 3 and the trailing edge 4 may be shaped in any manner required for a specific design. The rotor blade tip 5 may be so designed to provide an exhaust for the hot-air forced through the spar 1 for purposes of anti-icing the blade. Suitable vent holes 6 may be provided in the rotor blade.

As illustrated in Figure 3, the internal arrangement of one form of the invention may be such that the weight of the spar 7 will balance the weight of the after section 16 so that little, if any, ballast weight 9 is required. In this form of the invention the spar 7 is so shaped to provide an opening 10 that may extend the entire length of the blade or any portion thereof. The spar is provided with a leading edge fairing 11 and suitable clamps 12 to fasten the upper and lower portions of the metal skin 13 rigidly to the rolled edges 14 of the spar. The clamps 12 are tightened to the spar by means of suitable bolts 15. The after portions of the blade or trailing edge section 16 consists of a core 17 of suitable lightweight material satisfactorily cemented (bonded) to the skin to prevent buckling or wrinkling of the skin 13 in flight. The trailing edge wedge 18 affords stiffness to the trailing edge section. The after section 16 may be removed for replacement by loosening the bolts 15 after which the clamps 12 can be retained in position by use of a suitable jig or fixture not shown here.

Figure 4 illustrates a form of the invention which is intended to provide an easier means of fabricating the spar 19 in two segments. The after portion of the blade 20 may be made in a manner similar to that of Figure 3 or may be constructed of conventional rib and skin construction methods. The skin 21 is inserted in the forward rolled edges 22 of the spar and then these pieces are fastened together by riveting or by other suitable means of attachment. The after joint of the spar may be fastened together by means of rivets 23 or any other suitable means. The leading edge fairing 24 can be of light gage material or for electrical deicing purposes this may be an electrical heating element suitably fastened to a formed leading edge.

In Figure 5 an alternate method of fastening the skin to the forward spar joint 29 is illustrated. The capstrip 30 and clamp 31 are drawn together so as to crimp the skin around the rolled edges of the spar 32. The capstrip 30 may contain heating elements for deicing purposes. For clarity the skin has not been shown in this Figure 5 but would normally be assembled as shown in Figure 3.

While specific embodiments of the construction of a helicopter rotor blade of the applicant's invention have been herein described and shown, it is not desired to be strictly limited thereto since obviously one skilled in the art could make changes therein, e. g., changes in the number of segments composing the spar member, variation in the type of clamping means to hold the fairing strip on the leading edge, etc., without departing from the spirit or scope of the invention. Such variations and modifications are intended to be included within the scope of the invention to the extent as defined by the herewith appended claims.

The invention described herein may be manufactured and used by or for the Government of the United States of America for governmental purposes without the payment of any royalties thereon or therefor.

What is claimed is:

1. A helicopter rotor blade characterized by ready accessibility of its component parts in construction and for replacement purposes comprising a load carrying member positioned to form the leading edge of said rotor blade, interiorly extending flanges on the forward face of said member forming an opening in said face extending longitudinally thereof, a solid wedge shaped member positioned on the rear edge of said rotor blade, a metallic sheet converging toward the rear around said wedge shaped member to form the trailing edge of said blade, forming the upper and lower skin surface of said blade, the forward edges of said sheet extending into said opening between said interiorly extending flanges and crimped therearound, cellular material within the space formed by said sheet and firmly attached to the interior surfaces thereof, a fairing capstrip conforming to the leading edge of said rotor blade and covering said opening, and clamp means holding said fairing capstrip on said leading edge and said forward edges of said sheets crimped around said interiorly extending flanges.

2. A helicopter rotor blade characterized by ready accessibility of its component parts in construction and for replacement purposes comprising a bi-segmental load carrying spar member positioned to form the leading edge of said rotor blade, a flange extending rearwardly on each segment in matched relationship to the flange on the other segment, an inwardly extending flange on the forward edge of each of said segments, a solid wedge shaped member positioned on the rear edge of said rotor blade, a metallic sheet member securely attached to and around said wedge shaped member to form the trailing edge of said rotor blade, the forward edges of said sheet extending between said inwardly extending flanges of said segments, said rearwardly and interiorly extending flanges securely fastened together to integrate the spar member structure and to securely hold the forward edges of said metallic sheet member, cellular material within the space defined by the metallic sheet member, the spar member and the wedge shaped member, securely attached to the interior surface of said metallic sheet member, and a leading edge fairing member of curved cross-section to form the leading edge securely attached to the exterior surface of said metallic sheet.

3. A helicopter rotor blade characterized by ready accessibility of its component parts in construction and for replacement purposes comprising a bi-segmental load carrying spar member positioned to form the leading edge of said rotor blade, a flange extending rearwardly on each segment in matched relationship to the flange on the other segment, an inwardly extending flange on the forward edge of each of said segments forming an opening between said forward edges, a solid wedge shaped member positioned on the trailing edge of said rotor blade, a metallic sheet member securely attached to and around said solid wedge shaped member to form the trailing edge and the upper and lower skin surfaces of said rotor blade, said rearwardly extending flanges firmly attached together to form said spar member into a component of relatively high stiffness, the forward edges of said sheet member extending into the opening between said interiorly extending flanges and crimped therearound, cellular material in the space defined by said metallic sheet member, spar member and wedge shaped member and securely attached to the interior surface of said sheet member, a fairing capstrip curved in cross-section to conform to the leading edge of said rotor blade and clamp means in contact with the interior edges of said interiorly extending flanges to hold said fairing capstrip in close contact with the exterior surfaces of said metallic sheet and to cover the opening between said interiorly extending flanges.

4. In a helicopter rotor blade, a hollow load carrying spar of non-circular cross-section split in front to provide internally extending flanges slightly spaced lengthwise along substantially the neutral axis of said spar, a skin covering stretched around said blade with its forward edges inserted through said space, clamping means for holding said flanges and skin edges together, a capstrip fairing mounted over said space along the leading edge of said blade, said clamping means including clamp nuts for wedging said skin edges over the edges of said flanges, and bolts passed through said capstrip and into said nuts to hold the capstrip and clamp nuts in place.

5. The combination defined in claim 4, said capstrip including an electrical heating element suitably fixed thereto for deicing purposes.

6. In a helicopter rotor blade, a hollow load carrying spar having a longitudinal frontal slot with inwardly extending flanges on the longitudinal edges thereof, a capstrip fastened to and carried by the front part of said spar, a skin covering for the blade and including an upper panel and a lower panel, said panels having forward edge portions located in said slot and engaging said flanges, and said capstrip having a rear surface pressed against the outer surfaces of said panels adjacent to said forward edge portions of said panels.

7. In a helicopter rotor blade, a hollow load carrying spar having a longitudinal frontal slot with inwardly extending flanges on the longitudinal edges thereof, a skin covering for said blade and including two forward edge portions located in said slot, means fastening said forward edge portions of said covering to said flanges, a capstrip carried by said spar and located over said frontal slot, and said capstrip having rear surfaces contacting respectively the two forward edge portions of said covering.

8. In a helicopter rotor blade, a hollow load carrying spar having a longitudinal frontal slot with inwardly extending flanges on the longitudinal edges thereof, a skin covering for the blade and including forward edge portions disposed in said frontal slot, means fastening the forward edge portion of said covering to said flanges, a capstrip located over said frontal slot and carried by said spar, and a deicer heater carried by said capstrip to thereby locate said heater in advance of and spaced from said spar.

9. In a helicopter rotor blade, a load carrying spar having a frontal slot provided with upper and lower slot defining walls, a skin covering for the blade and including upper and lower forward edge portions respectively contacting said upper and lower walls, means for fastening said upper and lower forward edge portions of said covering to said spar, said means including a capstrip located in advance of said slot and contacting said skin covering adjacent to said upper and lower forward edge portions, clamps disposed behind said slot and contacting said upper and lower edge portions of said skin covering, and fastening elements connected with said capstrip and said clamps holding said clamps and said capstrip assembled on said spar to hold said upper and lower edge portions of said covering fastened to said spar.

10. The combination of claim 9 and; said upper and lower walls being curved, said upper and lower forward edge portions of said covering being curved to conform to the curvature of said walls, and said clamps having recesses in which at least parts of said upper and lower forward edge portions are disposed.

RAYMOND A. YOUNG.

REFERENCES CITED

The following references are of record in the file of this patent:

UNITED STATES PATENTS

| Number | Name | Date |
| --- | --- | --- |
| 1,603,051 | Hall | Oct. 12, 1926 |
| 1,829,922 | Carns | Nov. 3, 1931 |
| 1,939,599 | Ragsdale | Dec. 12, 1933 |
| 2,183,158 | Bennett | Dec. 12, 1939 |
| 2,390,761 | Watter | Dec. 11, 1945 |
| 2,428,970 | Hardy | Oct. 14, 1947 |
| 2,469,480 | Sikorsky | May 10, 1949 |
| 2,494,625 | Martin | Jan. 17, 1950 |

FOREIGN PATENTS

| Number | Country | Date |
| --- | --- | --- |
| 417,139 | Great Britain | Sept. 28, 1934 |
| 478,089 | Great Britain | Jan. 7, 1938 |